US012594756B2

(12) United States Patent
Vedder et al.

(10) Patent No.: US 12,594,756 B2
(45) Date of Patent: Apr. 7, 2026

(54) SYSTEM FOR RECOVERING A CLEANING SOLUTION AND PRINTING MACHINE

(71) Applicant: BOBST BIELEFELD GMBH, Bielefeld (DE)

(72) Inventors: Heiner Vedder, Bielefeld (DE); Christian Schreiber, Bielefeld (DE)

(73) Assignee: BOBST BIELEFELD GMBH, Bielefeld (DE)

( * ) Notice: Subject to any disclaimer, the term of this patent is extended or adjusted under 35 U.S.C. 154(b) by 0 days.

(21) Appl. No.: 18/703,863

(22) PCT Filed: Nov. 1, 2022

(86) PCT No.: PCT/EP2022/080426
§ 371 (c)(1),
(2) Date: Apr. 23, 2024

(87) PCT Pub. No.: WO2023/078865
PCT Pub. Date: May 11, 2023

(65) Prior Publication Data
US 2025/0001755 A1 Jan. 2, 2025

(30) Foreign Application Priority Data
Nov. 3, 2021 (EP) ..................................... 21206116

(51) Int. Cl.
*B41F 35/04* (2006.01)
*B01D 39/08* (2006.01)
(Continued)

(52) U.S. Cl.
CPC ............ *B41F 35/04* (2013.01); *B01D 39/083* (2013.01); *B41F 35/006* (2013.01); *B41F 35/02* (2013.01); *B41F 35/06* (2013.01); *B41P 2235/31* (2013.01)

(58) Field of Classification Search
CPC ........ B41F 35/00; B41F 35/006; B41F 35/02; B41F 35/04; B41F 35/06; B01D 39/083; B41P 2235/31
See application file for complete search history.

(56) References Cited

U.S. PATENT DOCUMENTS

| | | | | |
|---|---|---|---|---|
| 4,379,467 A | | 4/1983 | Purr | |
| 5,547,567 A | * | 8/1996 | Madsen | ................ B41F 35/005 |
| | | | | 210/167.01 |

(Continued)

FOREIGN PATENT DOCUMENTS

| | | | | |
|---|---|---|---|---|
| CN | 114953749 A | * | 8/2022 | .......... B41J 2/17503 |
| DE | 3913616 | * | 4/1989 | |

(Continued)

*Primary Examiner* — Christopher E Mahoney
*Assistant Examiner* — Marissa Ferguson-Samreth
(74) *Attorney, Agent, or Firm* — Bookoff McAndrews, PLLC

(57) ABSTRACT

A system (14) for recovering a cleaning solution for use in a printing machine (10) comprises a drain tank (36) with a calming section (38) and a recovery section (42) being fluidically connected to the calming section (38) and being arranged above the calming section (38). The system (14) further comprises an inlet pipe (32) for feeding a used cleaning solution into the calming section (38) of the drain tank (36), wherein the used cleaning solution comprises a cleaning fluid and an ink. The recovery section (42) is separated from the calming section (38) by means of a filter element (40) which is adapted to at least partially retain the ink in the calming section (38) such that a recovered cleaning solution is collected in the recovery section (42). Further, a printing machine (10) is provided.

14 Claims, 3 Drawing Sheets

(51) Int. Cl.
    *B41F 35/00*        (2006.01)
    *B41F 35/02*        (2006.01)
    *B41F 35/06*        (2006.01)

(56)           References Cited

U.S. PATENT DOCUMENTS

| | | | |
|---|---|---|---|
| 5,566,697 | A | 10/1996 | Cord et al. |
| 2013/0327717 | A1 * | 12/2013 | Petersson ............. B03D 1/1493 |
| | | | 210/150 |
| 2014/0224139 | A1 * | 8/2014 | Nadachi ................. B41F 31/02 |
| | | | 101/364 |

FOREIGN PATENT DOCUMENTS

| | | | | | |
|---|---|---|---|---|---|
| DE | 3913616 | A1 | 10/1990 | | |
| DE | 19738049 | A1 | 3/1999 | | |
| DE | 19648193 | * | 4/1999 | | |
| DE | 102011003247 | A1 * | 8/2012 | ............... | B41F 7/32 |
| EP | 0232448 | * | 8/1987 | | |
| EP | 0570727 | A1 | 11/1993 | | |
| EP | 570727 | * | 12/1993 | | |
| EP | 0779150 | * | 9/1996 | | |
| EP | 0779150 | A1 | 6/1997 | | |
| EP | 0844085 | * | 11/1997 | | |
| EP | 0844085 | A1 | 5/1998 | | |
| EP | 2654916 | A1 | 10/2013 | | |
| JP | S58132562 | A | 8/1983 | | |
| JP | H0796087 | B2 * | 10/1996 | | |
| JP | 11048459 | A * | 2/1999 | | |
| JP | H1148459 | A | 2/1999 | | |
| JP | 2007222710 | A * | 9/2007 | | |
| KR | 20190079823 | A * | 7/2019 | | |
| WO | 2012087239 | A1 | 6/2012 | | |

* cited by examiner

SYSTEM FOR RECOVERING A CLEANING SOLUTION AND PRINTING MACHINE

CROSS-REFERENCE TO RELATED APPLICATION(S)

This application is a National Stage Application under 35 U.S.C. § 371 of International Application No. PCT/EP2022/080426, filed on Nov. 1, 2022, which claims priority to European Application No. 21206116.2, filed on Nov. 3, 2021, the entireties of which are incorporated herein by reference.

The invention relates to a system for recovering a cleaning solution and a printing machine comprising said system for recovering a cleaning solution.

Printing machines use printing cylinders to transfer ink to a substrate, e.g. on paper, cardboard, foil or composites thereof. Therefore, the printing cylinders must be cleaned regularly to avoid that ink residues on the printing cylinder deteriorate the quality of subsequent printing operations.

For this purpose, cleaning solutions comprising a solvent are used to remove the ink, wherein the solvent is typically based on organic solvents or water. The amount of cleaning solution necessary mainly depends on the working width of the printing machine, i.e. the width of the printing cylinder actually used for ink deposition, the ink to be printed with and the type and design of the printing cylinders, e.g. of anilox rollers in a flexographic printing machine.

However, a high amount of cleaning solution is necessary to reach a desired cleaning effect, resulting in high amounts of chemicals to be provided, large volumes of used cleaning solutions which need to be disposed or treated in further steps, and generally high costs.

Solvents can partially be recycled, e.g. by distillation of the used cleaning solution and mixed with fresh cleaning solution to reduce the total amount of fresh cleaning solution needed. However, the recycling process is energy- and cost-intensive and increases the environmental impact of the operation of the printing machine.

It is an object of the invention to provide a system for recovering a cleaning solution for use in a printing machine which reduces a demand of solvent for cleaning operations. A further object of the invention is to reduce the demand of solvent for cleaning operations at a printing machine.

The object is solved by a system for recovering a cleaning solution for use in a printing machine. The system comprises a drain tank with a calming section and a recovery section being fluidically connected to the calming section and being arranged above the calming section. The system further comprises an inlet pipe for feeding a used cleaning solution into the calming section of the drain tank, wherein the used cleaning solution comprises a cleaning fluid and an ink. The recovery section is separated from the calming section by means of a filter element which is adapted to at least partially retain the ink in the calming section such that a recovered cleaning solution is collected in the recovery section.

The invention is based on the idea that a recovered cleaning solution can be obtained in an easy and cheap manner by making use of density differences between cleaning solutions with differing concentrations of ink and the flocculation behavior of the ink, i.e. the formation of ink flakes in solution. In this way, the recovered cleaning solution can be recollected in the upper recovery section of the drain tank after the ink has at least partially separated while the rest of the used cleaning solution is retained in the calming section. Accordingly, there is no energy-intensive recycling process necessary for obtaining the recovered cleaning solution.

According to the invention, the concentration of the ink in the recovered cleaning solution is lower than the concentration of the ink in the used cleaning solution. However, the concentration of the ink in the recovered cleaning solution can be zero or more, i.e. the recovered cleaning solution is not necessarily be completely free from ink but can be a semi-contaminated cleaning solution.

It has been found that recovered cleaning solutions, even in case there is still ink present in the recovered cleaning solution, can directly be re-used for cleaning the printing cylinder of a printing machine. Without being bound by theory, this effect is understood as being based on the effect that the used cleaning solution is typically not fully saturated with ink or at least the recovered cleaning solution is not fully saturated with ink.

Therefore, the same cleaning efficiency can be achieved with an overall lower amount of fresh cleaning solution, i.e. with an overall lower amount of fresh solvent, by re-using the recovered cleaning solution. In this way, the costs and the environmental impact of cleaning processes of a printing machine can be reduced.

The expression "being arranged above" means "geodetically arranged above", i.e. the recovery section is geodetically above the calming section.

In this way, a cleaning solution having a higher density is collected in the lower calming section at least partially due to the action of gravity. With other words, along a height direction of the drain tank, an ink concentration gradient is realized at least partially due to the action of gravity. This effect is further increased by the formation of ink flakes within the drain tank, i.e. larger agglomerates of the ink, especially of ink particles, which are formed from smaller colloidal particles of ink dispersed in the used cleaning solution.

Furthermore, the filter element prevents solid particles, including ink particles, from passing from the calming section into the recovery section, such that said solid particles are collected in the calming section. This effect further increases the rate of flocculation of ink particles.

For removing the recovered cleaning solution from the drain tank, a first discharge pipe can be fluidically connected to the recovery section of the drain tank. This allows to collect and/or re-use the recovered cleaning solution in an easy manner.

Preferably, the first discharge pipe is fluidically connected to a cleaning solution reservoir, especially to a cleaning solution reservoir of a printing machine. With other words, the system for recovering a cleaning solution can be used to at least partially re-fill the cleaning solution reservoir of a printing machine from which the cleaning solution for cleaning the printing cylinder is obtained.

The cleaning solution reservoir can comprise a container with fresh cleaning solution to which the recovered cleaning solution is mixed and/or a separate cleaning solution container for storing the recovered cleaning solution.

Also, the first discharge pipe can be directly and fluidically connected to a pipeline supplying recovered cleaning solution to a cleaning device of a printing machine, i.e. without an intermediate cleaning solution reservoir.

In one variant, the calming section of the drain tank comprises inclined bottom slopes forming an outlet of the drain tank. In this variant, the ink retained in the calming section, especially the larger ink particles being formed by flocculation, settles at least partially due to the action of gravity on the inclined bottom slopes and slide towards the outlet to be removed from the drain tank.

Based on the inclined bottom slopes, the drain tank can have a funnel shape with a conical outlet or a slit-like outlet extending along a width direction of the drain tank.

For optimizing the settling behavior of particles and the flow profile of the used cleaning solution in the calming section, the drain tank can include one or more additional bottom slopes which differ in their orientation relative to the inclined bottom slopes forming the outlet of the drain tank.

The outlet of the drain tank can be connected to an outlet valve for controlling the flow behavior of the used cleaning solution within the drain tank.

E.g., during an initial set-up phase of the system for recovering a cleaning solution, the outlet valve can be closed such that the drain tank fills up with used cleaning solution until an operation fill level of the drain tank is reached. During a following operation phase of the system for recovering a cleaning solution, the outlet valve is then opened such that the ratio between an inflow rate of the used cleaning solution in the drain tank and the flow rate of retained cleaning solution from the drain tank via the outlet is set to a value in which the operation fill level of the drain tank is maintained within a specified deviation.

The term "retained cleaning solution" is used for the used cleaning solution collected in the calming section.

According to the invention, the concentration of the ink in the retained cleaning solution in the calming section is higher than the concentration of the ink in the used cleaning solution.

For removing the retained cleaning solution, a second discharge pipe can be fluidically connected to the outlet.

The second discharge pipe can be connected fluidically to a disposal system.

The disposal system can also be a disposal system of a printing machine the system for recovering a cleaning solution is used in.

The disposal system can comprise a tank, a further treatment station and/or a distillation system. Accordingly, the retained cleaning solution can be treated with conventional processes as applied for printing machines as known in the state of the art.

Therefore, the system for recovering a cleaning solution can also be retrofitted into existing printing machines and recycling procedures.

To minimize or completely avoid turbulences within the drain tank when the used cleaning solution enters the calming section of the drain tank, the inlet pipe can have a funnel-shaped end section for feeding the used cleaning solution into the calming section of the drain tank.

To generate a smooth ink concentration gradient within the drain tank, the inlet pipe can be arranged centrally in the calming section.

Preferably, the end section of the inlet pipe is arranged close to the outlet. With other words, the end section of the inlet pipe is preferably closer to a lower end of the drain tank than to the recovery section at an upper end of the drain tank along the height direction.

In one variant, the inlet pipe is arranged next to an outside wall of the drain tank, wherein an inner surface of the outside wall forms part of the inlet pipe.

In this case, the end section of the inlet pipe preferably has a half-funnel like shape to minimize or completely avoid turbulences within the drain tank.

Also, the system can comprise a combination of a first inlet pipe, e.g. a first inlet pipe being centrally arranged within the drain tank, and at least one second inlet pipe being arranged next to an outside wall of the drain tank.

In a further variant, the ink comprises at least one color pigment. Color pigments are solid particles which are dispersed in colloidal form in the used cleaning solution and are prone to form larger flakes of particles which can be collected efficiently in the calming section of the drain tank due to their higher density compared to liquid components of the used cleaning solution. Therefore, the concentration of color pigments in the recovered cleaning solution can be minimized very efficiently in the drain tank due to the action of gravity.

For retaining solid particles, especially color pigments, in the calming section of the drain tank, the filter element can be a sieve.

E.g., the filter element can have a mesh size in the range of from 20 μm to 50 μm. A lower mesh size can increase the back-pressure of the filter element to much while a higher mesh size can lead to an undesirable high ink concentration in the recovered cleaning solution.

In one variant, a plurality of filter elements are present in the drain tank, wherein each of the plurality of filter elements are arranged at different heights along a height direction of the drain tank. In this variant, the recovery section is the uppermost section of the drain tank.

The first discharge pipe can also be directly and fluidically connected to the filter element, e.g. within the calming section or at the outside wall of the drain tank. In case several filter elements are used, the first discharge pipe can be directly and fluidically connected to one, more than one or all of the filter elements.

The cleaning fluid can comprise a solvent selected from the group consisting of water, organic solvents and combinations thereof. The type of cleaning fluid is preferably selected based on the type of ink to be removed from the printing cylinder of the printing machine.

If the ink is highly water-soluble, the solvent of the cleaning fluid preferably comprises or consists of water. If the ink is highly soluble in organic solvents, the solvent of the cleaning fluid preferably comprises or consists of at least one organic solvent.

Further, the cleaning fluid can comprise one or more additives, especially an additive supporting the flocculation behavior of the used cleaning solution. With other words, the additive especially supports the formation of ink particle or ink flakes.

The additive can already be present in the cleaning solution being fed to the drain tank by means of the inlet pipe and/or can be added to the drain tank by an additive supply pipe being fluidically connected to the drain tank, especially being fluidically connected to the calming section of the drain tank.

In one variant, the drain tank can be a main drain tank comprising a secondary drain tank arranged inside the main drain tank. The secondary drain tank comprises secondary inclined bottom slopes which are connected to the filter element forming a bottom section of the secondary drain tank. With other words, in this variant the system for recovering a cleaning solution realizes a multi-step separation process, wherein in each step a separation based on density differences within the respective solution occurs for obtaining the recovered cleaning solution.

The object of the invention is further solved by a printing machine comprising the system for recovering a cleaning solution as described above.

The printing machine can comprise a cleaning system for cleaning a printing cylinder which is at least partially covered with ink, the cleaning system comprising a cleaning device being adapted to apply the cleaning fluid to the printing cylinder under formation of the used cleaning solution and an intermediate tank for collecting the used cleaning solution. The intermediate tank is fluidically connected to the inlet pipe.

The cleaning device can be fluidically connected to a cleaning solution reservoir from which the cleaning fluid for application to the printing cylinder is received.

Preferably, the cleaning solution reservoir is the cleaning solution reservoir which is in fluid communication with the first discharge pipe connected to the recovery section of the drain tank.

In one variant, the printing cylinder is an anilox roll and the printing machine is a flexographic printing unit.

The printing machine can have a chamber doctor blade which is used as component of the cleaning system. With other words, the same chamber doctor blade can be used for application of ink to the printing cylinder during printing operations and for application of the cleaning solution to the printing cylinder in clean-up procedures, thereby minimizing the costs and complexity of the printing machine.

For this purpose, the chamber doctor blade can be fluidically connected to the intermediate tank.

Further advantages and features will become apparent from the following detailed description of the invention and from the appended figures which show non-limiting exemplary embodiments of the invention and in which:

FIG. 1 schematically shows a first embodiment of a system for recovering a cleaning solution and a printing machine with said system;

Figure 1:
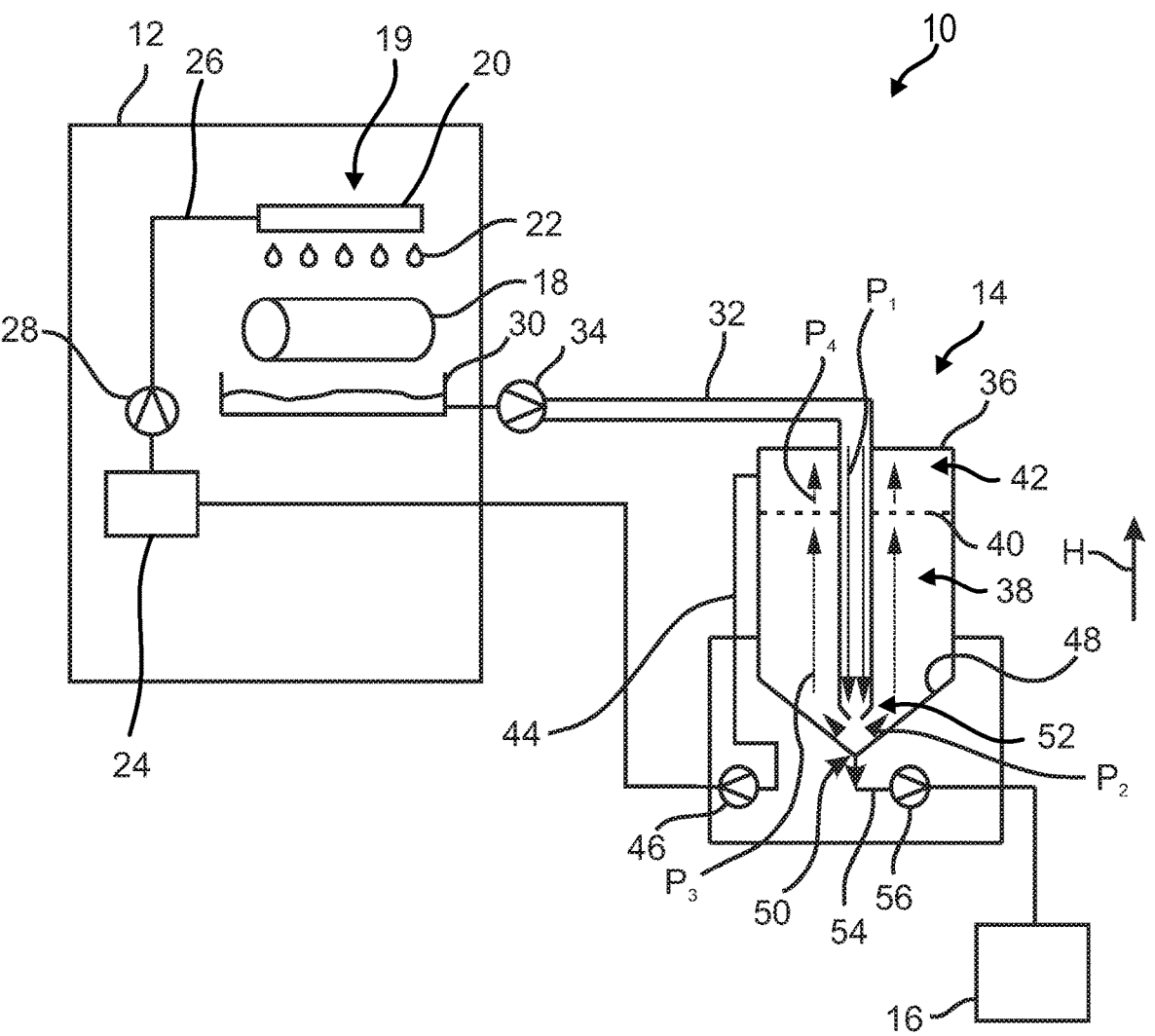

FIG. 1 schematically shows a first embodiment of a printing machine 10 according to the invention comprising a printing module 12, a system 14 for recovering a cleaning solution according to the invention and a disposal system 16.

The printing module 12 has a printing cylinder 18, e.g. an anilox roll. The printing cylinder 18 is used during operation of the printing machine 10 to transfer an ink on a (not shown) substrate, e.g. paper, cardboard, foil or a composite thereof.

The printing module 12 further comprises a cleaning system 19 with a cleaning device 20 being adapted to apply a cleaning fluid to the printing cylinder 18, as indicated by droplets 22. E.g., the cleaning device 20 comprises one or more (not shown) nozzles with which the cleaning fluid is sprayed onto the printing cylinder 18.

The cleaning fluid is provided to the cleaning device 20 from a cleaning solution reservoir 24 by means of a feed pipe 26. The flow rate of the cleaning solution can be controlled by a feed pump 28.

The printing module 12 additionally has an intermediate tank 30 arranged below the printing cylinder 18.

The intermediate tank is fluidically connected to an inlet pipe 32 of the system 14 for recovering a cleaning solution by means of an inlet pump 34.

The system 14 comprises a drain tank 36 with a calming section 38, a filter element 40 and a recovery section 42 being separated from the calming section 38 by the filter element 40.

The recovery section 42 is arranged geodetically above the calming section 38 and is fluidically connected to the cleaning solution reservoir 24 by means of a first discharge pipe 44 and a first discharge pump 46. The discharge pipe 44 can also be connected directly to cleaning device 20.

The drain tank 36 comprises inclined bottom slopes 48 which form an outlet 50 of the drain tank 36.

Close to and above the outlet 50, a funnel-shaped end section 52 of the inlet pipe 32 is arranged.

Additionally, the outlet 50 is fluidically connected to a second discharge pipe 54 and by means of a second discharge pump 56 to the disposal system 16, which is e.g. a tank, a further treatment station and/or a distillation system.

The filter element 40 is arranged such that it surrounds the inlet pipe 32 and extends from the inlet pipe 32 to the inner wall of a housing of the drain tank 36. E.g., the filter element 40 is ring-shaped with the inlet pipe 32 extending through the center of the filter element 40.

Of course, differing shapes and designs of the filter element 40 can be used as long as a sufficient separation between the calming section 38 and the recovery section 42 is provided.

In the following, the mode of action of the printing machine 10 is explained in more detail.

If the printing cylinder 18 shall be cleaned, i.e. ink shall be removed from the surface of the printing cylinder 18, the printing machine 10 can enter a clean-up procedure. The clean-up procedure can be manually started and/or can be part of an automated printing job of the printing machine 10.

The use of cleaning solution from reservoir 24 or discharge pipe 44 is part of cleaning process, depending on necessity, at any time. The cleaning device 20 is supplied with a cleaning solution from the cleaning solution reservoir 24, or directly from pipeline 44, wherein the cleaning solution comprises a solvent selected from the group consisting of water, organic solvents and combinations thereof.

The cleaning fluid is applied by the cleaning device 20 to the printing cylinder 18, thereby at least partially removing the ink from the surface of the printing cylinder 18 under formation of a used cleaning solution comprising the cleaning solution and ink particles washed from the printing cylinder 18.

The used cleaning solution is collected within the intermediate tank 30 from which the used cleaning solution is transferred by the inlet pump 34 via the inlet pipe 32 into the drain tank 36, specifically into the calming section 38, i.e. the lower section, of the drain tank 36 as indicated by arrows $P_1$.

The used cleaning solution fills the drain tank 36, as indicated by arrows $P_2$, $P_3$ and $P_4$.

Within the drain tank 36, the ink particles being present in the used cleaning solution start to form larger particles, i.e. are subject to a flocculation process.

To promote the flocculation process, the cleaning solution can comprise one or more additives or one or more additives can be added via an additive supply line (not shown) to the cleaning solution reservoir 24, the intermediate tank 30 and/or the drain tank 38.

At least partially due to the action of gravity, the ink particles start to settle within the drain tank 36, specifically within the calming section 38, and are collected on the inclined bottom slopes 48 and close to the outlet 50.

This process leads to a formation of an ink concentration gradient along a height direction H of the drain tank 36. With other words, the concentration of ink close to the outlet 50 (i.e., close to arrow $P_2$) is higher than the concentration of ink further above in the calming section 38 (i.e., close to arrow $P_3$) which in turn is higher than the concentration of ink in the recovery section 42 (i.e., close to arrow $P_4$).

The difference in ink concentration is further enhanced by the filter element 40 which in the shown embodiment is a sieve with a mesh size in the range down close to ink-particle-size. This might be in the range from 20 μm to 50 μm. Accordingly, ink particles with a size larger than the mesh size of the filter element 40 are held back by the filter element 40 within the calming section 38. In this regard, it does not matter whether ink particles of said size have been present already in the used cleaning solution when being transferred in the drain tank 36 or if these ink particles have been formed during flocculation.

In this way, a recovered cleaning solution is formed in the recovery section 42 while in the calming section 38 a retained cleaning solution is formed, wherein the ink concentration of the recovered cleaning solution is lower than the ink concentration of the used cleaning solution and the ink concentration of the retained cleaning solution is higher than the ink concentration of the used cleaning solution.

According to the invention, the ink concentration of the recovered cleaning solution can be larger than zero but shall be below the saturation point of the ink in the cleaning solution.

The recovered cleaning solution is therefore transferred to the cleaning solution reservoir 24 by the first discharge pump 46 via the first discharge pipe 44. This allows for re-application of the recovered cleaning solution onto the printing cylinder 18 to remove additional amounts of ink from the surface of the printing cylinder 18.

With other words, the system 14 for recovering a cleaning solution allows to re-use at least parts of the initial cleaning solution several times, e.g. two or three times, until the used cleaning solution is saturated with ink, thereby decreasing the total amount of fresh cleaning solution necessary to clean the printing cylinder 18. This also allows to decrease the overall size of the cleaning solution reservoir 24.

System 14 can also work continuously, level indication in 42 operate the pump 56 to keep low saturated solvent in 42 always at a sufficient amount.

In principle, the first discharge pipe 44 can also be directly connected to the cleaning device 20, i.e. without to at least partially re-fill the cleaning solution reservoir 24; or without reservoir 24 at all.

The ink particles retained in the calming section 38, more specifically the retained cleaning solution comprising said ink particles, can be removed from the drain tank 36 by the second discharge pump 56 via the second discharge pipe 54 to the disposal system 16.

Within the disposal system 16, the retained cleaning solution can be subjected to conventional further treatment processes, e.g. recovery of the solvent of the cleaning solution and/or disposal.

The system 14 for recovering a cleaning solution allows to at least partially recover cleaning fluid during a clean-up procedure of the printing machine 10 without the use of energy-intensive recycling processes and thereby reduces the costs and the environmental impact of clean-up procedures of the printing machine 10. At the same time, the system 14 for recovering a cleaning solution is easy to operate and reliable.

Figure 2:
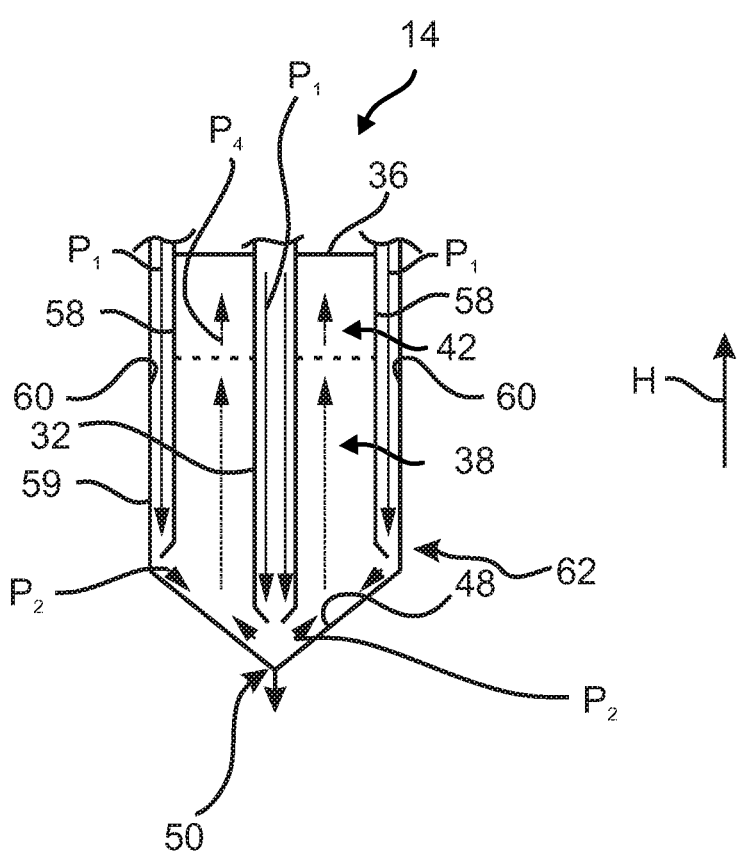
FIG. 2 shows selected parts of a seconded embodiment of the system of FIG. 1.

FIG. 2 shows selected parts of a second embodiment of the system 14 for recovering a cleaning solution as described above.

The second embodiment essentially corresponds to the first embodiment such that in the following only differences will be discussed. Same reference numerals are used for same components and reference is made to the explanations given above.

In the second embodiment, the system 14 for recovering a cleaning solution comprises a first inlet pipe 32 corresponding to the inlet pipe 32 of the first embodiment and two second inlet pipes 58 which are arranged next to an outside wall 59 of the housing of the drain tank 36.

The second inlet pipes 58 are arranged on opposite sides of the drain tank 36 such that an inner surface 60 of the drain tank 36 forms part of each of the second inlet pipes 58.

End sections 62 of the second inlet pipes 58 have a half-funnel like shape for at least minimizing any turbulences within the drain tank 36 when used cleaning solution enters the drain tank 36 through the second inlet pipes 58.

Figure 3:
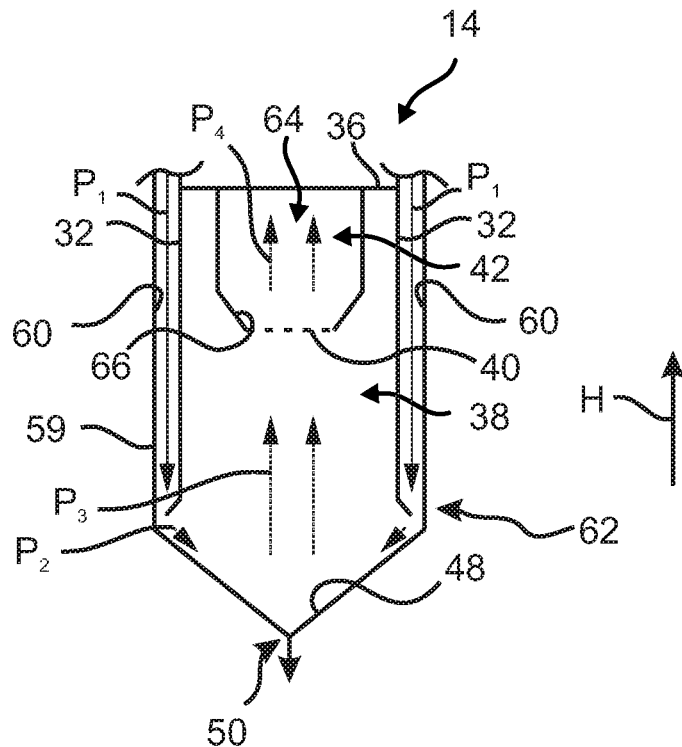
FIG. 3 shows selected parts of a third embodiment of the system of FIG. 1.

FIG. 3 shows selected parts of a third embodiment of the system 14 for recovering a cleaning solution as described above.

The third embodiment essentially corresponds to the first and second embodiments such that in the following only differences will be discussed. Same reference numerals are used for same components and reference is made to the explanations given above.

In the third embodiment, instead of the centrally arranged inlet pipe 32, two inlet pipes 32 are used which correspond to the second inlet pipes 58 of the second embodiment.

Additionally, in the third embodiment the drain tank 36 is a main drain tank comprising an additional secondary drain tank 64 which is arranged centrally within the main drain tank.

The filter element 40 forms a bottom section of the secondary drain tank such that the recovery section 42 is located in an upper part of the secondary drain tank 64.

Accordingly, the first discharge pipe 44 (not shown in FIG. 3) is arranged such that the recovered cleaning solution can be obtained from the secondary drain tank 64.

Further, the secondary drain tank 64 comprises secondary inclined bottom slopes 66 to promote an additional flocculation process above the filter element 40. With other words, within the secondary drain tank 64, additional ink particles can form such that there is a further concentration gradient within the secondary drain tank 64.

Figure 4:
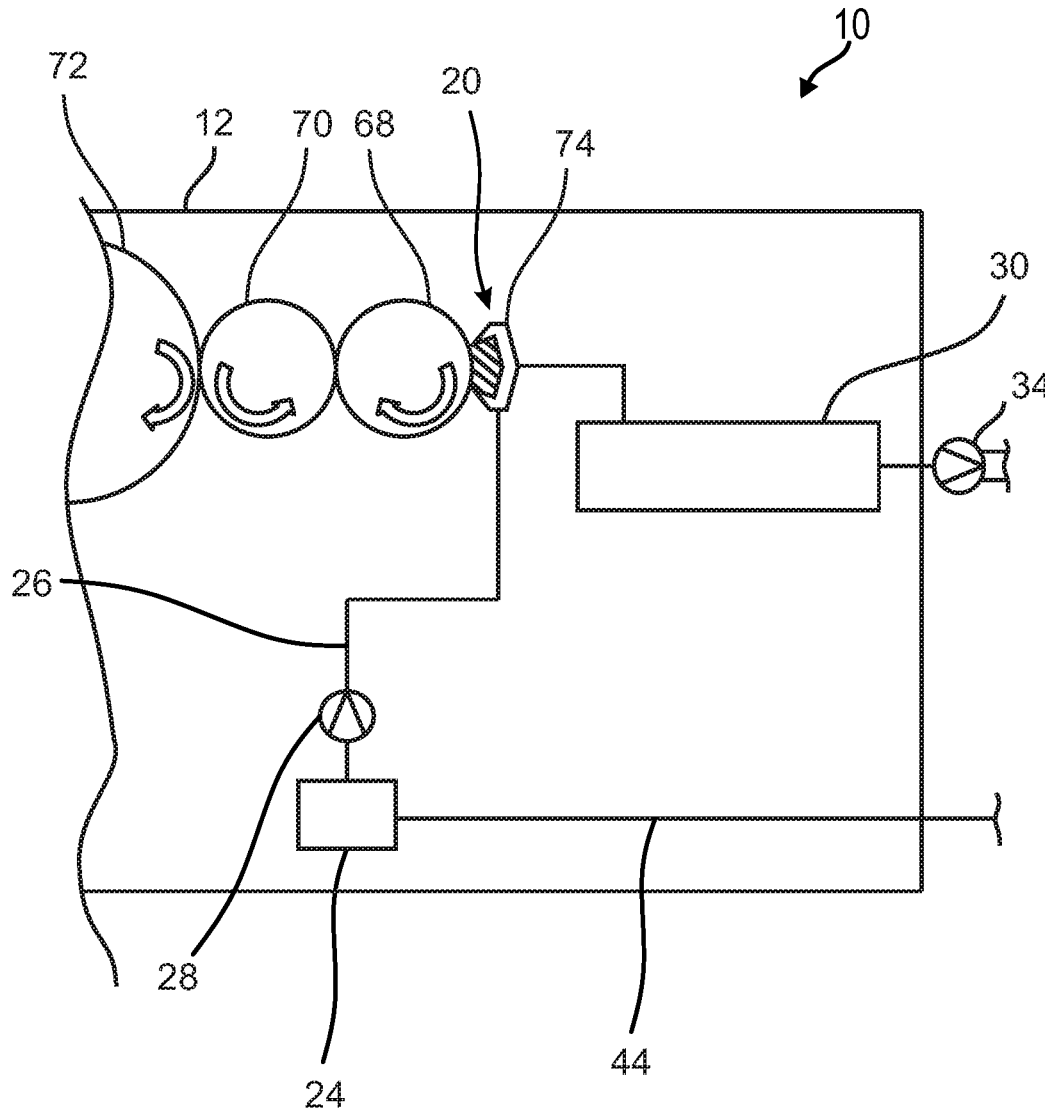
FIG. 4 shows selected parts of an alternative embodiment of the printing machine of FIG. 1.

FIG. 4 shows selected parts of an alternative embodiment of the printing module 12 of the printing machine 10 of FIG. 1.

The alternative embodiment essentially corresponds to the previous embodiments such that in the following only differences will be discussed. Same reference numerals are used for same components and reference is made to the explanations given above.

In the alternative embodiment, the printing module 12 is a flexographic printing module comprising an anilox roll 68, a plate cylinder 70 and an impression cylinder 72. During printing operation of the printing module 12, ink is supplied to the anilox roll 68 by means of a chamber doctor blade 74. From the anilox roll 68, the ink is then transferred to the plate cylinder 70 and onto a (not shown) substrate provided between the plate cylinder 70 and the impression cylinder 72.

The chamber doctor blade 74 is also fluidically connected to the feed pipe 26 through which cleaning solution can be supplied to the chamber doctor blade 74 via the feed pump 28 and to the intermediate tank 30. Accordingly, the chamber doctor blade 74 is also used as cleaning device 20 in clean-up procedures of the printing machine 10.

The invention claimed is:

1. A system for recovering a cleaning solution for use in a printing machine, wherein the system comprises:

a drain tank with a calming section and a recovery section being fluidically connected to the calming section and being arranged above the calming section, and an inlet pipe for feeding a used cleaning solution into the calming section of the drain tank, wherein the used cleaning solution comprises a cleaning fluid and an ink, wherein the recovery section is separated in the drain tank from the calming section by means of a filter element, in the drain tank above the calming section and below the recovery section, which is adapted to at least partially retain the ink in the calming section such that a recovered cleaning solution is collected in the recovery section, wherein the filter element surrounds a portion of the inlet pipe within the drain tank, and wherein along a height direction of the drain tank an ink concentration gradient is realized at least partially due to the action of gravity.

2. The system according to claim 1, wherein a first discharge pipe is fluidically connected to the recovery section of the drain tank.

3. The system according to claim 2, wherein the first discharge pipe is fluidically connected to a cleaning solution reservoir.

4. The system according to claim 1, wherein the calming section comprises inclined bottom slopes forming an outlet of the drain tank.

5. The system according to claim 4, further comprising a second discharge pipe is fluidically connected to the outlet.

6. The system according to claim 5, wherein the second discharge pipe is fluidically connected to a disposal system.

7. The system according to claim 1, wherein the inlet pipe has a funnel-shaped end section for feeding the used cleaning solution into the calming section of the drain tank.

8. The system according to claim 1, wherein the inlet pipe is arranged centrally in the calming section.

9. The system according to claim 1, wherein the ink comprises at least one color pigment.

10. The system according to claim 1, wherein the filter element is a sieve.

11. The system according to claim 10, wherein the filter element has a mesh size in the range close to a size of ink-particles, wherein the mesh size is in the range of from 20 μm to 50 μm.

12. The system according to claim 1, wherein the cleaning fluid comprises water and/or an organic solvent.

13. A printing machine comprising the system for recovering a cleaning solution according to claim 1.

14. The printing machine according to claim 13, wherein the printing machine comprises a cleaning system for cleaning a printing cylinder which is at least partially covered with ink, the cleaning system comprising a cleaning device being adapted to apply the cleaning fluid to the printing cylinder under formation of the used cleaning solution and an intermediate tank for collecting the used cleaning solution, and wherein the intermediate tank is fluidically connected to the inlet pipe.

* * * * *